(12) United States Patent
Duong

(10) Patent No.: US 10,519,870 B2
(45) Date of Patent: Dec. 31, 2019

(54) MULTIPLE MOUNTING SURFACE GEARBOX

(71) Applicant: United Technologies Corporation, Farmington, CT (US)

(72) Inventor: Hung Duong, Unionville, CT (US)

(73) Assignee: UNITED TECHNOLOGIES CORPORATION, Farmington, CT (US)

( * ) Notice: Subject to any disclaimer, the term of this patent is extended or adjusted under 35 U.S.C. 154(b) by 286 days.

(21) Appl. No.: 15/996,844

(22) Filed: Jun. 4, 2018

(65) Prior Publication Data
US 2019/0368423 A1 Dec. 5, 2019

(51) Int. Cl.
F02C 7/32 (2006.01)
F01D 15/12 (2006.01)
F16H 57/033 (2012.01)
F16H 57/02 (2012.01)

(52) U.S. Cl.
CPC .............. F02C 7/32 (2013.01); F01D 15/12 (2013.01); F05D 2220/323 (2013.01); F05D 2260/4031 (2013.01); F16H 57/033 (2013.01); F16H 2057/02043 (2013.01); F16H 2057/02086 (2013.01)

(58) Field of Classification Search
CPC ................................. F01D 15/12; F02C 7/36
See application file for complete search history.

(56) References Cited

U.S. PATENT DOCUMENTS

| 8,050,899 B2* | 11/2011 | Giguere | G06Q 10/06 703/6 |
| 8,973,465 B2* | 3/2015 | Duong | F16H 1/222 74/665 F |
| 2004/0118128 A1* | 6/2004 | Bruno | F02C 7/32 60/801 |
| 2009/0302152 A1* | 12/2009 | Knight | B64D 41/00 244/58 |
| 2016/0245183 A1* | 8/2016 | Viel | F02C 7/32 |
| 2017/0009660 A1* | 1/2017 | Viel | F02C 7/32 |
| 2017/0218848 A1* | 8/2017 | Alstad | F02C 7/32 |
| 2018/0313274 A1* | 11/2018 | Suciu | F02C 7/36 |

* cited by examiner

Primary Examiner — Woody A Lee, Jr.
(74) Attorney, Agent, or Firm — Snell & Wilmer, L.L.P.

(57) ABSTRACT

A gearbox for a gas turbine engine may comprise a first gear housing. A second gear housing may be located proximate a first end of the first gear housing and may extend axially from the first gear housing. A third gear housing may be located proximate a second end of the first gear housing and may extend axially from the first gear housing. A fourth gear housing may extend circumferentially between second gear housing and the third gear housing.

20 Claims, 4 Drawing Sheets

MULTIPLE MOUNTING SURFACE GEARBOX

FIELD

The present disclosure relates to gearboxes and, in particular, to gearboxes for gas turbine engines.

BACKGROUND

A typical gas turbine engine for an aircraft may include an accessory drive gearbox. The gearbox is rotationally coupled to at least one spool of the engine by a tower shaft. The gearbox may be located in the space between the engine core and a core nacelle, which surrounds the engine core. Various accessory gearbox components may be coupled to and rotationally driven by gears trains housed within the gearbox. The accessory gearbox components can vary in size and may have different temperatures requirements. These variances is size and temperature can lead to difficulties fitting the gearbox and the accessories gearbox components between the core nacelle and engine core.

SUMMARY

A gearbox for a gas turbine engine is described herein. In accordance with various embodiments, the gearbox may comprise a first gear housing. A second gear housing may be located proximate a first end of the first gear housing and extending axially from the first gear housing. A third gear housing may be located proximate a second end of the first gear housing and extending axially from the first gear housing. The first end of the first gear housing may be opposite the second end of the first gear housing. A fourth gear housing may extend circumferentially between the second gear housing and the third gear housing.

In various embodiments, a first gear train may be located in the first gear housing. A second gear train may be located in the second gear housing. A third gear train may be located in the third gear housing. A fourth gear train may be located in the fourth gear housing.

In various embodiments, an input gear of the first gear train may be configured to be operably coupled to a tower shaft of the gas turbine engine. The tower shaft may extend in a generally radial direction. The input gear and the tower shaft may be coaxial.

In various embodiments, an input gear of the first gear train may be configured to be operably coupled to a lay shaft of the gas turbine engine. The lay shaft may extend in a generally axial direction. The input gear and the lay shaft may be coaxial.

In various embodiments, a first rotational axis of the first gear train, a second rotational axis of the second gear train, a third rotational axis of the third gear train, and a fourth rotational axis of the fourth gear train may extend outwardly in mutually divergent directions such that the first rotational axis, the second rotational axis, the third rotational axis, and the fourth rotational axis are non-parallel to one another.

In various embodiments, the fourth gear housing may comprise a first mounting surface and a second mounting surface opposite the first mounting surface. The first mounting surface may be oriented aftward and the second mounting surface may be oriented forward.

A gas turbine engine is also described herein. In accordance with various embodiments, the gas turbine engine may comprise a compressor, a turbine aft of the compressor, an engine static structure housing the compressor and the turbine, and a gearbox supported by the engine static structure. The gearbox may comprise a first gear housing, a second gear housing located proximate a first end of the first gear housing and extending axially from the first gear housing, a third gear housing located proximate a second end of the first gear housing and extending axially from the first gear housing, and a fourth gear housing extending circumferentially between the second gear housing and the third gear housing. The first end of the first gear housing may be opposite the second end of the first gear housing.

In various embodiments, a first gear train may be located in the first gear housing. A second gear train may be located in the second gear housing. A third gear train may be located in the third gear housing. A fourth gear train may be located in the fourth gear housing.

In various embodiments, a spool may connect the compressor and the turbine for rotation about an engine longitudinal axis. A tower shaft may be rotationally driven by the spool. The tower shaft may rotationally drive the first gear train.

In various embodiments, the tower shaft and an input gear of the first gear train may be coaxial.

In various embodiments, a lay shaft may be rotationally coupled between the tower shaft and an input gear of the first gear train.

In various embodiments, a first rotational axis of the first gear train, a second rotational axis of the second gear train, and a third rotational axis of the third gear train may extend outwardly in mutually divergent directions such that the first rotational axis, the second rotational axis, and the third rotational axis are non-parallel to one another.

In various embodiments, the fourth gear housing may comprise a first mounting surface and a second mounting surface opposite the first mounting surface. The first mounting surface may be oriented aftward and the second mounting surface may be oriented forward.

In accordance with various embodiments, a gearbox for a gas turbine engine may comprise a first gear train. A second gear train may be rotationally coupled to a first end of the first gear train. A third gear train may be rotationally coupled to a second end of the first gear train. A fourth gear train may be rotationally coupled to the third gear train. A first rotational axis of the first gear train, a second rotational axis of the second gear train, and a third rotational axis of the third gear train may extend outwardly in mutually divergent directions such that the first rotational axis, the second rotational axis, and the third rotational axis are non-parallel to one another.

In various embodiments, the gearbox may further comprise a first gear housing. The first gear train may be located in the first gear housing. A second gear housing may be located proximate a first end of the first gear housing and extending axially from the first gear housing. The second gear train may be located in the second gear housing. A third gear housing may be located proximate a second end of the first gear housing and extending axially from the first gear housing. The third gear train may be located in the third gear housing. A fourth gear housing may extend circumferentially between the second gear housing and the third gear housing. The fourth gear train may be located in the fourth gear housing.

In various embodiments, the fourth gear housing may comprise a first mounting surface and a second mounting surface opposite the first mounting surface. The first mounting surface may be oriented aftward and the second mounting surface may be oriented forward.

In various embodiments, an input gear of the first gear train may be configured to be rotationally driven by a tower shaft of the gas turbine engine. The tower shaft and the input gear may be coaxial.

The forgoing features and elements may be combined in various combinations without exclusivity, unless expressly indicated herein otherwise. These features and elements as well as the operation of the disclosed embodiments will become more apparent in light of the following description and accompanying drawings.

BRIEF DESCRIPTION OF THE DRAWINGS

The subject matter of the present disclosure is particularly pointed out and distinctly claimed in the concluding portion of the specification. A more complete understanding of the present disclosure, however, may best be obtained by referring to the detailed description and claims when considered in connection with the drawing figures, wherein like numerals denote like elements.

DETAILED DESCRIPTION

Figure 1:
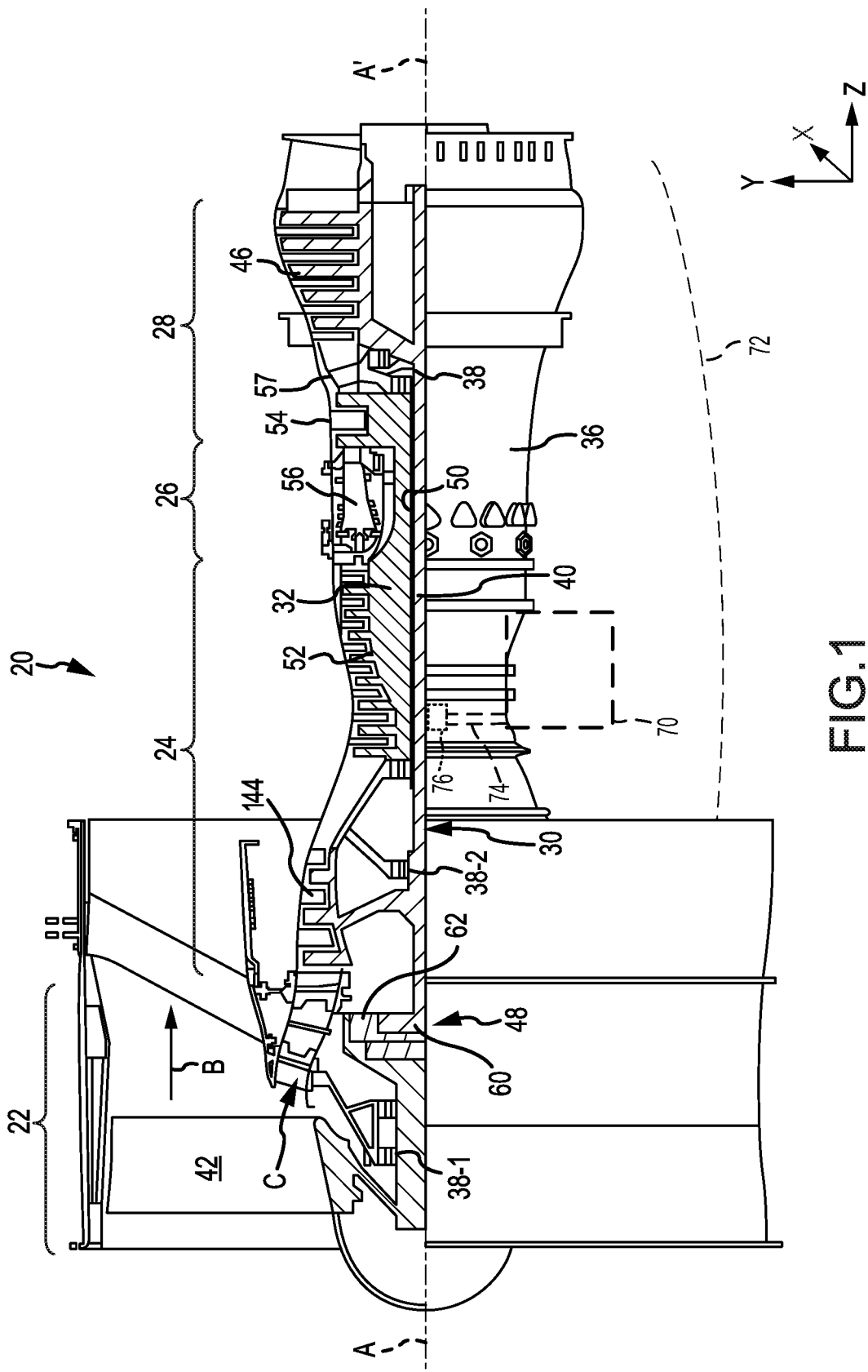
FIG. 1 illustrates a gas turbine engine, in accordance with various embodiments.

The detailed description of exemplary embodiments herein makes reference to the accompanying drawings, which show exemplary embodiments by way of illustration. While these exemplary embodiments are described in sufficient detail to enable those skilled in the art to practice the disclosures, it should be understood that other embodiments may be realized and that logical changes and adaptations in design and construction may be made in accordance with this disclosure and the teachings herein. Thus, the detailed description herein is presented for purposes of illustration only and not of limitation. The steps recited in any of the method or process descriptions may be executed in any order and are not necessarily limited to the order presented.

Furthermore, any reference to singular includes plural embodiments, and any reference to more than one component or step may include a singular embodiment or step. Also, any reference to attached, fixed, coupled, connected or the like may include permanent, removable, temporary, partial, full, and/or any other possible attachment option. Additionally, any reference to without contact (or similar phrases) may also include reduced contact or minimal contact.

Cross hatching lines may be used throughout the figures to denote different parts but not necessarily to denote the same or different materials. Throughout the present disclosure, like reference numbers denote like elements. Accordingly, elements with like element numbering may be shown in the figures, but may not be necessarily be repeated herein for the sake of clarity.

As used herein, "aft" refers to the direction associated with a tail (e.g., the back end) of an aircraft, or generally, to the direction of exhaust of a gas turbine engine. As used herein, "forward" refers to the direction associated with a nose (e.g., the front end) of the aircraft, or generally, to the direction of flight or motion.

A first component that is "radially outward" of a second component means that the first component is positioned at a greater distance away from the engine central longitudinal axis than the second component. A first component that is "radially inward" of a second component means that the first component is positioned closer to the engine central longitudinal axis than the second component. In the case of components that rotate circumferentially about the engine central longitudinal axis, a first component that is radially inward of a second component rotates through a circumferentially shorter path than the second component. The terminology "radially outward" and "radially inward" may also be used relative to references other than the engine central longitudinal axis.

Gas turbine engines of the present disclosure may include gearboxes having multiple mounting surfaces. In various embodiments, the gearboxes may comprise four gear trains housed within four gear housings. Each of the gear housing may have at least two mounting surfaces. The mounting surfaces may be oriented both axially and radially, such that the components may be positioned in more desirable locations, for example, where more space is available and/or where cooler temperatures are provided. Accordingly, a gearbox having multiple mounting surfaces may increase flexibility with regard to gas turbine engine assembly.

With reference to FIG. 1, a gas turbine engine 20 is disclosed. Gas turbine engine 20 may comprise a two-spool turbofan that generally incorporates a fan section 22, a compressor section 24, a combustor section 26, and a turbine section 28. Gas turbine engine 20 may also comprise, for example, an augmenter section, and/or any other suitable system, section, or feature. In operation, fan section 22 may drive air along a bypass flow-path B, while compressor section 24 may further drive air along a core flow-path C for compression and communication into combustor section 26, before expansion through turbine section 28. Although depicted as a turbofan gas turbine engine 20 herein, it should be understood that the concepts described herein are not limited to use with turbofans as the teachings may be applied to other types of turbine engines including multi-spool architectures, as well as industrial gas turbines.

In various embodiments, gas turbine engine 20 may comprise a low speed spool 30 and a high speed spool 32 mounted for rotation about an engine central longitudinal axis A-A' relative to an engine static structure 36 via one or more bearing systems 38 (shown as, for example, bearing system 38-1 and bearing system 38-2 in FIG. 1). Engine central longitudinal axis A-A' is oriented in the z direction (axial direction) on the provided xyz axes. The y direction on the provided xyz axes refers to radial directions and the x direction on the provided xyz axes refers to the circumferential direction. It should be understood that various bearing systems 38 at various locations may alternatively or additionally be provided, including, for example, bearing system 38, bearing system 38-1, and/or bearing system 38-2.

In various embodiments, low speed spool 30 may comprise an inner shaft 40 that interconnects a fan 42, a low pressure compressor 44, and a low pressure turbine 46. Inner shaft 40 may be connected to fan 42 through a geared architecture 48 that can drive fan 42 at a lower speed than low speed spool 30. Geared architecture 48 may comprise a gear assembly 60 enclosed within a gear housing 62. Gear assembly 60 may couple inner shaft 40 to a rotating fan structure. High speed spool 32 may comprise an outer shaft 50 that interconnects a high pressure compressor 52 and high pressure turbine 54. A combustor 56 may be located between high pressure compressor 52 and high pressure turbine 54. In various embodiments, engine static structure 36 may include a mid-turbine frame 57. The mid-turbine frame 57, if included, may be located generally between high pressure turbine 54 and low pressure turbine 46. Mid-turbine frame 57 may support one or more bearing systems 38 in turbine section 28. Inner shaft 40 and outer shaft 50 may be concentric and rotate via bearing systems 38 about the engine central longitudinal axis A-A', which is collinear with their longitudinal axes. As used herein, a "high pressure" compressor or turbine experiences a higher pressure than a corresponding "low pressure" compressor or turbine.

In various embodiments, the air along core flow-path C may be compressed by low pressure compressor 44 and high pressure compressor 52, mixed and burned with fuel in combustor 56, and expanded over high pressure turbine 54 and low pressure turbine 46. Low pressure turbine 46 and high pressure turbine 54 may rotationally drive low speed spool 30 and high speed spool 32, respectively, in response to the expansion.

In various embodiments, gas turbine engine 20 may include a bypass ratio greater than about ten (10:1) and the fan diameter may be significantly larger than an outer diameter of the low pressure compressor 44. It should be understood, however, that the above parameters are only exemplary of one embodiment of a gas turbine engine including a geared architecture and that the present disclosure is applicable to other gas turbine engines.

A gearbox 70 is coupled to and/or supported by engine static structure 36. A core nacelle 72 may be arranged about the engine static structure 36 and may enclose gearbox 70. Gearbox 70 is operatively coupled to low speed spool 30 or high speed spool 32 by a tower shaft 74. For example, tower shaft 74 may be rotationally coupled to high speed spool 32 (or to low speed spool 30) via a gear set 76, for example via a set of beveled gears. Tower shaft 74 may transfer torque from high speed spool 32 (or from low speed spool 30) to various gear trains of gearbox 70. Tower shaft 74 may extend in a generally radial direction, such that an end of tower shaft 74, which is proximate gear set 76, is radially inward of an end of tower shaft 74 that is proximate gearbox 70.

Figure 2A:
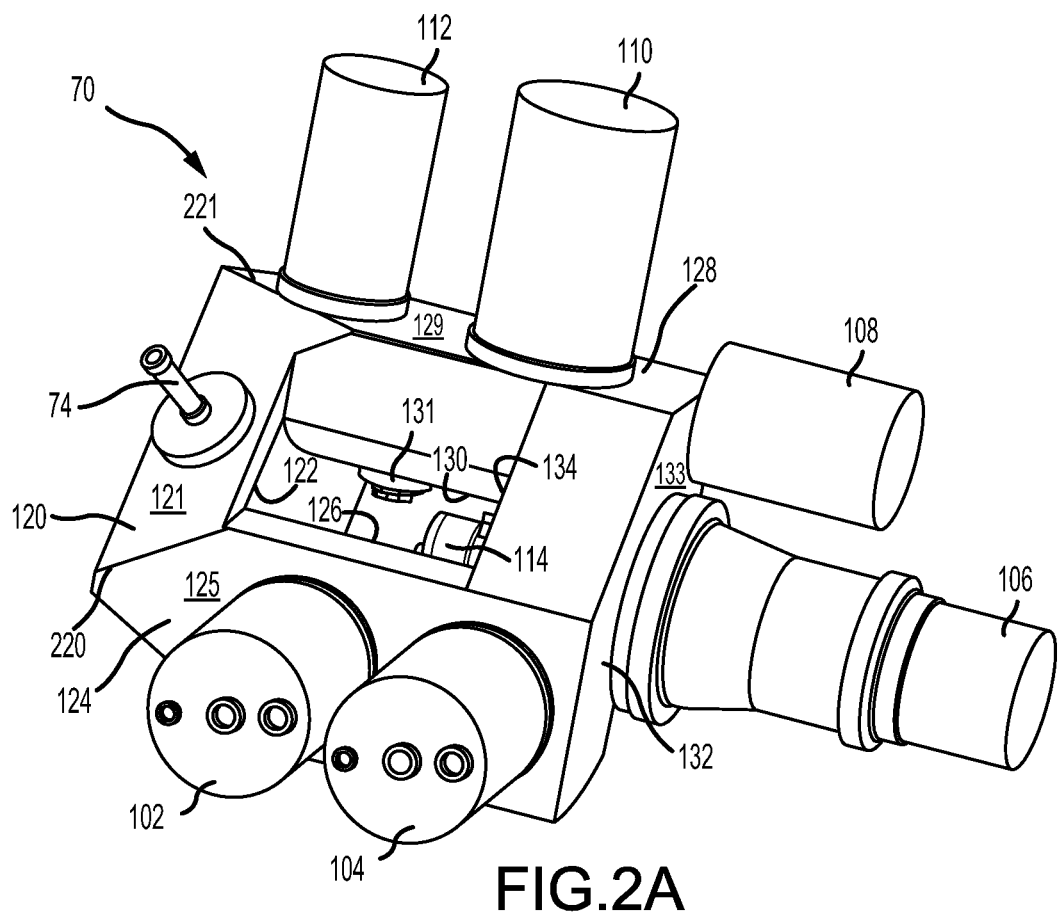
FIGS. 2A and 2B illustrate perspective views of a gearbox for a gas turbine engine, in accordance with various embodiments.
Figure 2B:
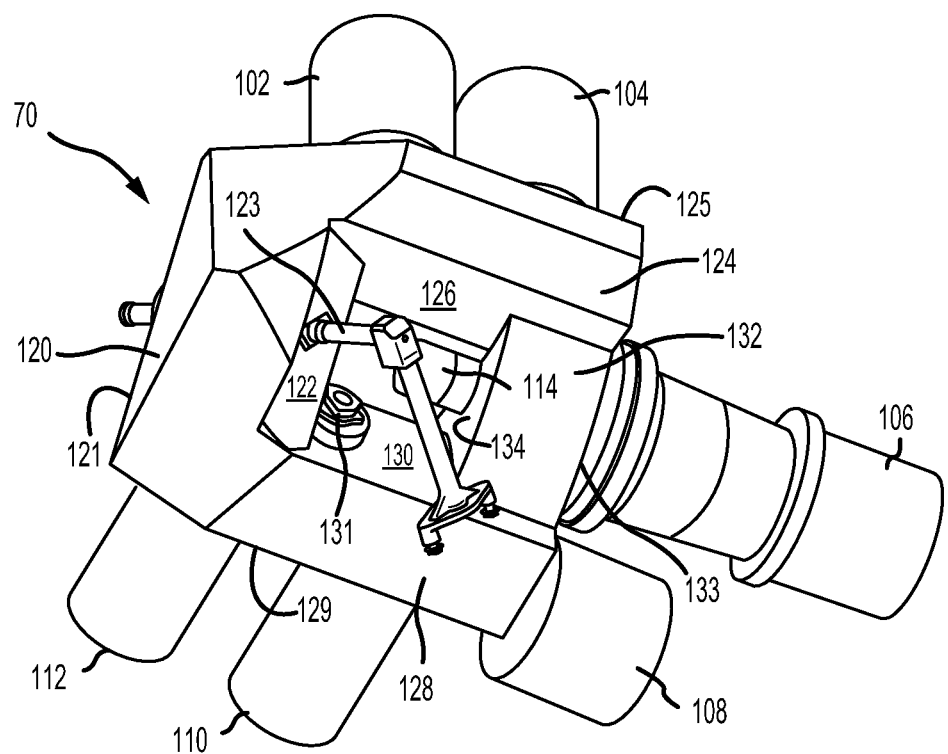

Referring to FIG. 2A, tower shaft 74 is operatively coupled to and may rotationally drive various accessory gearbox components 102, 104, 106, 108, 110, 112, and 114 supported by gearbox 70. With reference to FIGS. 2A and 2B, gearbox 70 includes a polygonal shape having multiple mounting surfaces for accessory gearbox components. For example, gearbox 70 includes a first gear housing 120. First gear housing may house a first gear train 400, with momentary reference to FIG. 3A, and may support the coupling of tower shaft 74 to first gear train 400. First gear housing 120 may also support a manual crank 123. Manual crank 123 may be operatively coupled to first gear train 400, with momentary reference to FIG. 3A.

First gear housing 120 comprises a first mounting surface 121 and a second mounting surface 122. Second mounting surface 122 may be oriented generally opposite, or away from, first mounting surface 121. First mounting surface 121 may be oriented generally towards engine static structure 36 of FIG. 1. Additional accessory gearbox components may be mounted over first mounting surface 121 and/or second mounting surface 122. Components mounted over first mounting surface 121 and second mounting surface 122 may be rotationally coupled to, and driven by, first gear train 400, with momentary reference to FIG. 3A.

Gearbox 70 further includes a second gear housing 124. Second gear housing 124 may extend axially from a first end 220 of first gear housing 120. Stated differently, second gear housing 124 may extend from first end 220 of first gear housing 120 in a direction generally parallel to engine central longitudinal axis A-A' in FIG. 1. In various embodiments, second gear housing 124 may be integral to first gear housing 120. Second gear housing 124 may house a second gear train 402, with momentary reference to FIG. 3A. Second gear housing 124 comprises a first mounting surface 125 and a second mounting surface 126. Second mounting surface 126 may be oriented generally opposite, or away from, first mounting surface 125. Second gear housing 124 (e.g., first mounting surface 125 of second gear housing 124) may support accessory gearbox components 102 and 104. In various embodiments, accessory gearbox components 102 and 104 may be hydraulic pumps. In various embodiments, accessory gearbox component 104 may be a permanent magnet alternator (PMA). In various embodiments, additional accessory gearbox components may be mounted over first mounting surface 125 and/or over second mounting surface 126. Components mounted over first mounting surface 125 and second mounting surface 126 may be rotationally coupled to, and driven by, second gear train 402, with momentary reference to FIG. 3A.

Gearbox 70 further includes a third gear housing 128. Third gear housing 128 may extend axially from a second end 221 of first gear housing 120. Stated differently, second gear housing 124 may extend from second end 221 of first gear housing 120 in a direction generally parallel to engine central longitudinal axis A-A' in FIG. 1. Second end 221 of first gear housing 120 may be located generally opposite first end 220. In various embodiments, third gear housing 128 may be integral to first gear housing 120. Third gear housing 128 may house a third gear train 404, with momentary reference to FIG. 3A. Third gear housing 128 comprises a first mounting surface 129 and a second mounting surface 130. Second mounting surface 130 may be oriented generally opposite, or away from, first mounting surface 129. Third gear housing 128 (e.g., first mounting surface 129 of third gear housing 128) may support accessory gearbox components 110 and 112. In various embodiments, accessory gearbox component 110 may be a fuel pump, and accessory gearbox component 112 may be an air turbine starter (ATS). In various embodiments, third gear housing 128 (e.g., second mounting surface 130 of third gear housing 128) may support a deoiler 131. In various embodiments, additional accessory gearbox components may be mounted over first mounting surface 129 and/or over second mounting surface 130. Components mounted over first mounting surface 129 and second mounting surface 130 may be rotationally coupled to, and driven by, third gear train 404, with momentary reference to FIG. 3A.

Gearbox 70 further includes a fourth gear housing 132. Fourth gear housing 132 extends circumferentially between second gear housing 124 and third gear housing 128. In various embodiments, fourth gear housing 132 may be integral to second gear housing 124 and third gear housing 128. Fourth gear housing 132 may house a fourth gear train 406, with momentary reference to FIG. 3A. Fourth gear housing 132 comprises a first mounting surface 133 and a second mounting surface 134. Second mounting surface 134 may be oriented generally opposite, or away from, first mounting surface 133. In various embodiments, first mounting surface 133 and second mounting surface 134 may be oriented in an axial direction such that they extend in a generally radial direction. Stated differently, first mounting surface 133 may be oriented generally aftward and second mounting surface 134 may be oriented generally forward.

Fourth gear housing 132 (e.g., first mounting surface 133 and/or second mounting surface 134 of fourth gear housing 132) may support accessory gearbox components 106, 108, and 114. In various embodiments, accessory gearbox component 106 may be a variable frequency generator (VFG), accessory gearbox component 108 may be a lubrication pump, and accessory gearbox component 114 may be a PMA. In various embodiments, accessory gearbox components 106 and 108 may be mounted over first mounting surface 133, and accessory gearbox component 114 may be mounted over second mounting surface 134. In various embodiments, additional accessory gearbox components may be mounted over first mounting surface 133 and/or over second mounting surface 134. Components mounted over first mounting surface 133 and second mounting surface 134 may be rotationally coupled to, and driven by, fourth gear train 406, with momentary reference to FIG. 3A.

While gearbox 70 is illustrated with accessory gearbox components 102 and 104 supported by second gear housing 124, accessory gearbox components 106, 108, and 114 supported by fourth gear housing 132, and accessory gearbox components 110 and 112 supported by third gear housing 128, it is further contemplated and understood that accessory gearbox components 102, 104, 106, 108, 110, 112, and 114 may be located over any mounting surface of gearbox 70 and driven by any gear train within gearbox 70. The location of accessory gearbox components 102, 104, 106, 108, 110, 112, and 114 may be determined based on a desired direction of rotation, speed of rotation, or any other operating condition of accessory gearbox components 102, 104, 106, 108, 110, 112, and 114.

In various embodiments, accessory gearbox components of greater length may be mounted to first mounting surface 133, as there is generally more space aft of gearbox 70, as compared to radially outward from gearbox 70. In this regard, gearbox 70 may be able accommodate longer components, even in engines having reduced radial space between the engine core and the core nacelle. Gearbox 70 may allow accessory gearbox components to be oriented both axially and radially, such that the components may be positioned in more desirable locations, where more space is available and/or where cooler temperatures are provided. In this regard, gearbox 70 may increase flexibility with regard to gas turbine engine assembly.

In various embodiments, at least a portion of first gear housing 120, second gear housing 124, third gear housing 128, and/or fourth gear housing 132 may be removable to provide access to the gear trains within gearbox 70. In this manner, the components of any gear train within gearbox 70 may be easily serviced.

Figure 3A:
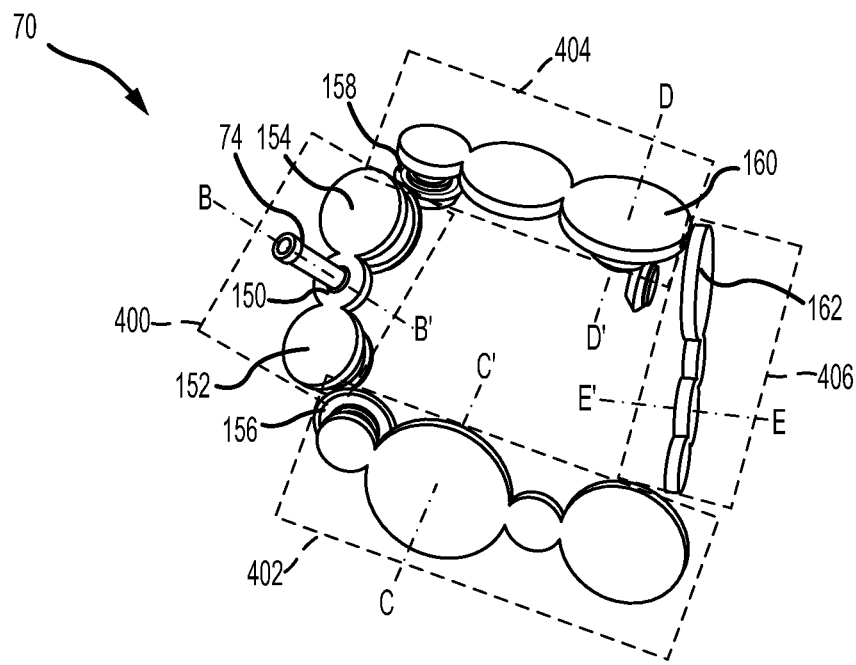
FIGS. 3A and 3B illustrate perspective views of the gear trains of the gearbox of FIG. 2A, in accordance with various embodiments.

With reference to FIG. 3A, the gear trains of gearbox 70 are illustrated, in accordance with various embodiments. An end of tower shaft 74 may be mechanically mounted to an input gear 150 of first gear train 400. Stated differently, input gear 150 may be rotationally coupled to tower shaft 74 by, for example, splined interface. Input gear 150 and tower shaft 74 may be coaxial. In this regard, input gear 150 and tower shaft 74 may each rotate about common axis B-B'.

Input gear 150 may engage (e.g., may be meshed with) and may rotationally drive idler gears 152 and 154 of first gear train 400.

Second gear train 402 is rotationally coupled to and driven by first gear train 400. For example, a gear 156 of second gear train 402 may engage (e.g., may be meshed with) idler gear 152 of first gear train 400. Third gear train 404 is also rotationally coupled to and driven by first gear train 400. For example, a gear 158 of third gear train 404 may engage (e.g., may be meshed with) idler gear 154 of first gear train 400. In various embodiments, idlers gears 152 and 154 may be located at opposing ends of first gear train 400. Fourth gear train 406 is rotationally coupled to and driven by third gear train 404. For example, a gear 162 of fourth gear train 406 may engage (e.g., may be meshed with) a gear 160 of third gear train 404. In various embodiments, gears 158 and 160 may be located at opposing ends of third gear train 404. While fourth gear train 406 is illustrated as rotationally coupled to third gear train 404, it should be understood that fourth gear train 406 may also be rotationally coupled to second gear train 402.

In various embodiments, axis of rotation B-B' of first gear train 400, an axis of rotation C-C' of second gear train 402, an axis of rotation D-D' of third gear train 404, and an axis of rotation D-D' of fourth gear train 406 may each extend outwardly in mutually divergent directions, such that axis of rotation B-B', axis of rotation C-C', axis of rotation D-D', and axis of rotation E-E' are non-parallel to one another. In various embodiments, the gears of the first gear train 400 may be parallel with one another and with respect to a plane that is generally perpendicular to axis of rotation B-B'. In various embodiments, gears of the second gear train 402 may be parallel with one another and with respect to a plane that is generally perpendicular to axis of rotation C-C'. In various embodiments, gears of the third gear train 404 may be parallel with one another and with respect to a plane that is generally perpendicular to axis of rotation D-D'. In various embodiments, gears of the fourth gear train 406 may be parallel with one another and with respect to a plane that is generally perpendicular to axis of rotation E-E'. In various embodiments, axis of rotation E-E' may be generally parallel to engine central longitudinal axis A-A' of FIG. 1.

Figure 3B:
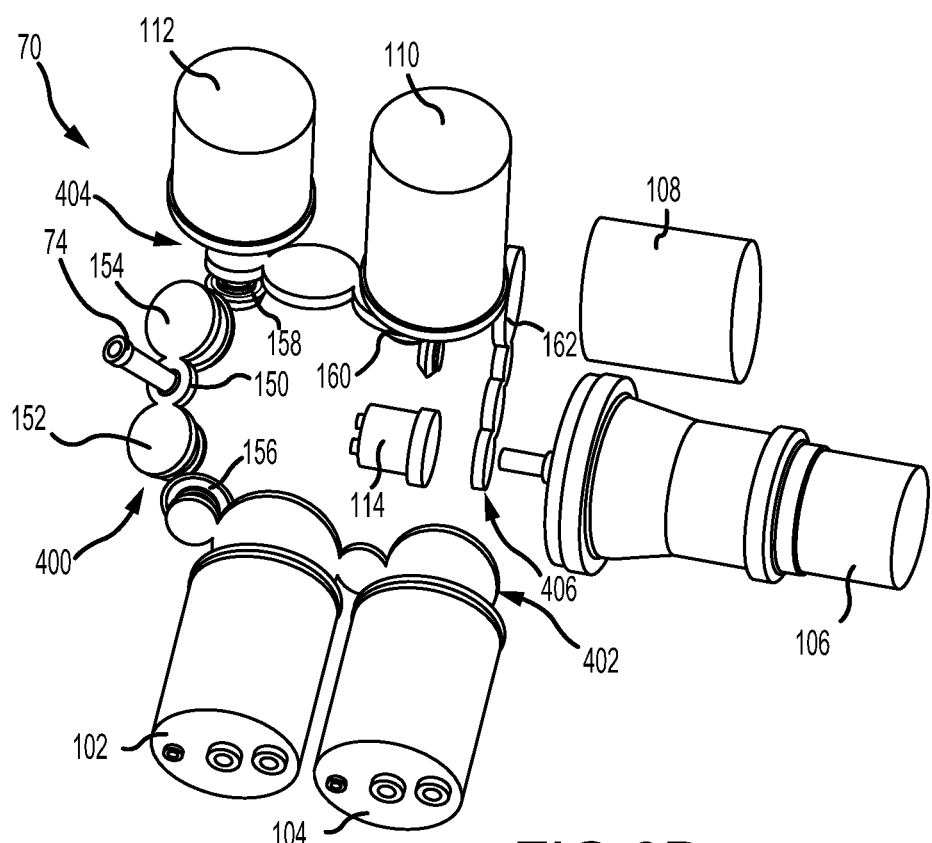

With reference to FIG. 3B, the gears of second gear train 402 are rotationally coupled to and are configured to drive accessory gearbox components 102 and 104. The gears of third gear train 404 are rotationally coupled to and are configured to drive accessory gearbox components 110 and 112. The gears of fourth gear train 406 are rotationally coupled to and are configured to drive accessory gearbox components 106, 108, and 114. Accordingly, the rotational axes of accessory gearbox components 102 and 104, the rotational axes of accessory gearbox components 106, 108, and 114, and the rotational axes of accessory gearbox components 110 and 112 may be non-parallel to one another. For example, the rotational axes of the accessory gearbox components 102, 104, 110, and 112 may be arranged tangentially relative to the circumference of engine static structure 36 (with brief reference to FIG. 1), and the rotational axes of the accessory gearbox components 106, 108, and 114 may be arranged generally parallel to engine central longitudinal axis A-A' of FIG. 1.

Figure 4A:
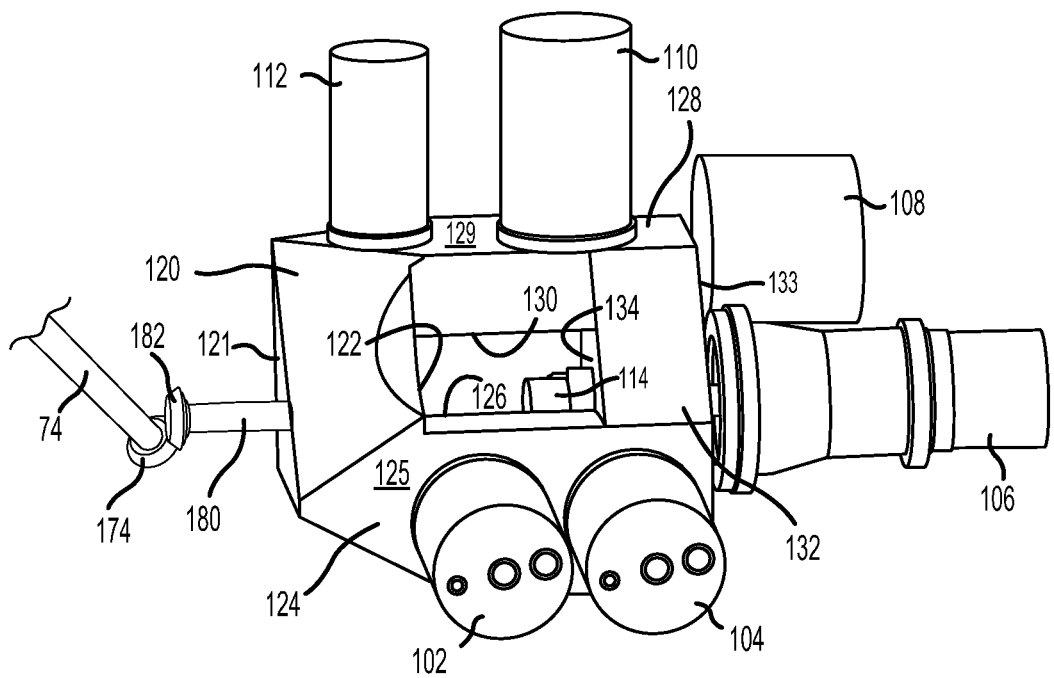
FIG. 4A illustrates a perspective view of a gearbox for a gas turbine engine, in accordance with various embodiments.
Figure 4B:
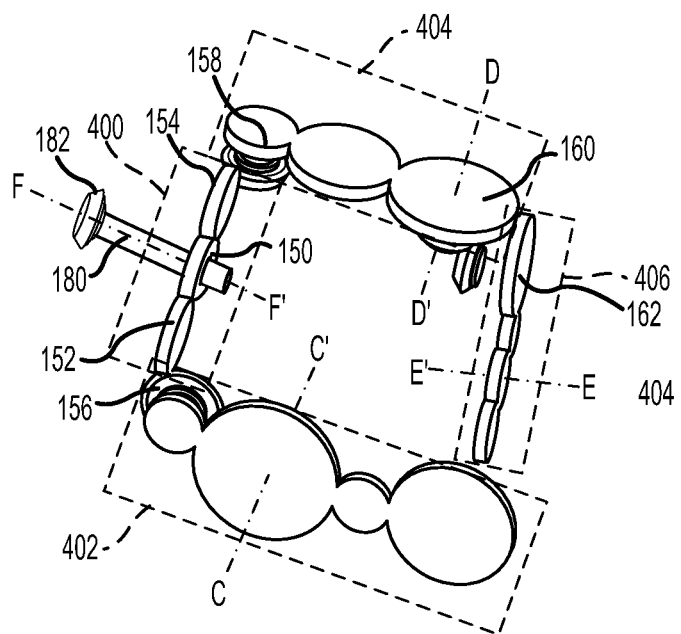
FIG. 4B illustrates a perspective view of the gear trains of the gearbox of FIG. 4A, in accordance with various embodiments.

With reference to FIGS. 4A and 4B, in various embodiments, gearbox 70 may be configured to be rotationally coupled to a lay shaft 180. Lay shaft 180 may be located between tower shaft 74 and input gear 150 of first gear train 400, and may transfer torque from tower shaft 74 to first gear train 400. For example, an end of tower shaft 74 may be mechanically coupled by, for example, splined interface to a gear 174. Gear 174 may engage (e.g., may be meshed with) a gear 182 mounted to a first end of lay shaft 180. A second end of lay shaft 180 may be mechanically coupled by, for example, splined interface to input gear 150 of first gear train 400.

In various embodiments, lay shaft 180 may be oriented in a generally axial direction and/or parallel to engine central longitudinal axis A-A'. In this regard, the end of lay shaft 180 that is proximate tower shaft 74 may be forward of the end of lay shaft 180 that is proximate input gear 150. In various embodiments, input gear 150 and lay shaft 180 may be coaxial, such that input gear 150 and lay shaft 180 both rotate about an axis F-F'. First mounting surface 121 and second mounting surface 122 may be generally perpendicular to axis F-F'. In various embodiments, first mounting surface 121 may be oriented generally away from fourth gear housing 132. Stated differently, first mounting surface 121 may be facing forward. Second mounting surface 122 may be oriented generally toward fourth gear housing 132. Stated differently, second mounting surface 122 may be facing aft. In various embodiments, additional accessory gearbox components may be mounted over first mounting surface 121 and/or second mounting surface 122. Axially oriented first mounting surface 121 may allow for longer components and/or components that need a cooler temperature to be mounted to gearbox 70.

In various embodiments, axis of rotation F-F' of first gear train 400 may be parallel to axis of rotation E-E' of fourth gear train 406, and non-parallel to axis of rotation C-C' of second gear train 402 and axis of rotation D-D' of third gear train 404. In this regard, axis of rotation F-F' of first gear train 400, axis of rotation C-C' of second gear train 402, and axis of rotation D-D' of third gear train 404 may each extend outwardly in mutually divergent directions, such that axis of rotation F-F', axis of rotation C-C', and axis of rotation D-D' are non-parallel to one another.

Gearbox 70 may allow accessory gearbox components to be oriented both axially and radially, such that the components may be positioned in more desirable locations, where more space is available and/or where cooler temperatures are provided. In this regard, gearbox 70 may increase flexibility with regard to gas turbine engine assembly.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the inventions is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C.

Systems, methods and apparatus are provided herein. In the detailed description herein, references to "one embodiment," "an embodiment," "various embodiments," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it may be within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element is intended to invoke 35 U.S.C. 112(f) unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. A gearbox for a gas turbine engine, comprising:
   a first gear housing;
   a second gear housing located proximate a first end of the first gear housing and extending axially from the first gear housing;
   a third gear housing located proximate a second end of the first gear housing and extending axially from the first gear housing, wherein the first end of the first gear housing is opposite the second end of the first gear housing; and
   a fourth gear housing extending circumferentially between the second gear housing and the third gear housing, wherein the first gear housing is located at a first axial end of the third gear housing, and wherein the fourth gear housing is located at a second axial end of the third gear housing opposite the first axial end.

2. The gearbox of claim 1, further comprising:
   a first gear train located in the first gear housing;
   a second gear train located in the second gear housing;
   a third gear train located in the third gear housing; and
   a fourth gear train located in the fourth gear housing.

3. The gearbox of claim 2, wherein an input gear of the first gear train is configured to be operably coupled to a tower shaft of the gas turbine engine, wherein the tower shaft extends in a generally radial direction.

4. The gearbox of claim 3, wherein the input gear and the tower shaft are coaxial.

5. The gearbox of claim 2, an input gear of the first gear train is configured to be operably coupled to a lay shaft of the gas turbine engine, wherein the lay shaft extends in an axial direction.

6. The gearbox of claim 5, wherein the input gear and the lay shaft are coaxial.

7. The gearbox of claim 2, wherein a first rotational axis of the first gear train, a second rotational axis of the second gear train, a third rotational axis of the third gear train, and a fourth rotational axis of the fourth gear train extend outwardly in mutually divergent directions such that the first rotational axis, the second rotational axis, the third rotational axis, and the fourth rotational axis are non-parallel to one another.

8. The gearbox of claim 1, wherein the fourth gear housing comprises a first mounting surface and a second mounting surface opposite the first mounting surface, and wherein the first mounting surface is oriented aftward and the second mounting surface is oriented forward.

9. A gas turbine engine, comprising:
a compressor;
a turbine aft of the compressor;
an engine static structure housing the compressor and the turbine; and
a gearbox supported by the engine static structure, the gearbox comprising:
a first gear housing,
a second gear housing located proximate a first end of the first gear housing and extending axially from the first gear housing,
a third gear housing located proximate a second end of the first gear housing and extending axially from the first gear housing, wherein the first end of the first gear housing is opposite the second end of the first gear housing, and
a fourth gear housing extending circumferentially between the second gear housing and the third gear housing, wherein the first gear housing is located at a first axial end of the gearbox and the fourth gear housing is located at a second axial end of the gearbox opposite the first axial end.

10. The gas turbine engine of claim 9, further comprising:
a first gear train located in the first gear housing;
a second gear train located in the second gear housing;
a third gear train located in the third gear housing; and
a fourth gear train located in the fourth gear housing.

11. The gas turbine engine of claim 10, further comprising:
a spool connecting the compressor and the turbine for rotation about an engine longitudinal axis; and
a tower shaft rotationally driven by the spool, wherein the tower shaft rotationally drives the first gear train.

12. The gas turbine engine of claim 11, wherein the tower shaft and an input gear of the first gear train are coaxial.

13. The gas turbine engine of claim 11, further comprising a lay shaft rotationally coupled between the tower shaft and an input gear of the first gear train.

14. The gas turbine engine of claim 13, wherein a first rotational axis of the first gear train, a second rotational axis of the second gear train, and a third rotational axis of the third gear train extend outwardly in mutually divergent directions such that the first rotational axis, the second rotational axis, and the third rotational axis are non-parallel to one another.

15. The gas turbine engine of claim 9, wherein the fourth gear housing comprises a first mounting surface and a second mounting surface opposite the first mounting surface, and wherein the first mounting surface is oriented aftward and the second mounting surface is oriented forward.

16. A gearbox for a gas turbine engine, comprising:
a first gear train;
a second gear train rotationally coupled to a first end of the first gear train;
a third gear train rotationally coupled to a second end of the first gear train; and
a fourth gear train rotationally coupled to the third gear train,
wherein a first rotational axis of the first gear train, a second rotational axis of the second gear train, and a third rotational axis of the third gear train extend outwardly in mutually divergent directions such that the first rotational axis, the second rotational axis, and the third rotational axis are non-parallel to one another, and wherein the first gear train is located at a first axial end of the gearbox and the fourth gear train is located at a second axial end of the gearbox opposite the first axial end.

17. The gearbox of claim 16, further comprising
a first gear housing, wherein the first gear train is located in the first gear housing;
a second gear housing located proximate a first end of the first gear housing and extending axially from the first gear housing, wherein the second gear train is located in the second gear housing;
a third gear housing located proximate a second end of the first gear housing and extending axially from the first gear housing, wherein the third gear train is located in the third gear housing; and
a fourth gear housing extending circumferentially between the second gear housing and the third gear housing, wherein the fourth gear train is located in the fourth gear housing.

18. The gearbox of claim 17, wherein the fourth gear housing comprises a first mounting surface and a second mounting surface opposite the first mounting surface, and wherein the first mounting surface is oriented aftward and the second mounting surface is oriented forward.

19. The gearbox of claim 16, wherein an input gear of the first gear train is configured to be rotationally driven by a tower shaft of the gas turbine engine.

20. The gearbox of claim 19, wherein the tower shaft and the input gear are coaxial.

* * * * *